United States Patent [19]

Marton

[11] Patent Number: 5,187,423
[45] Date of Patent: Feb. 16, 1993

[54] SYSTEM FOR REPLENISHMENT OF ENERGY STORED IN A BATTERY ON AN ELECTRIC VEHICLE

[76] Inventor: Louis L. Marton, 401 Shirley Pl., No. 105, Beverly Hills, Calif. 90212

[21] Appl. No.: 700,264

[22] Filed: May 15, 1991

[51] Int. Cl.$^5$ .......................... B60K 1/04; H22J 7/00
[52] U.S. Cl. ........................................ 320/2; 104/34; 414/281
[58] Field of Search ............. 320/2; 104/34; 414/280, 414/281, 282

[56] References Cited

U.S. PATENT DOCUMENTS

| | | | |
|---|---|---|---|
| 718,543 | 1/1903 | Starks | 414/281 |
| 4,052,655 | 10/1977 | Vizza | 320/2 |
| 4,184,580 | 1/1980 | Ellis, Jr. | 194/1 R |
| 4,334,819 | 6/1982 | Hammerslag | 414/395 |
| 4,394,706 | 7/1983 | Crafts | 361/331 |
| 4,450,400 | 5/1984 | Gwyn | 320/2 |
| 4,532,418 | 7/1985 | Meese et al. | 235/281 |
| 4,667,141 | 5/1987 | Steele | 320/2 |
| 4,744,430 | 5/1988 | McCoy | 180/22 |
| 4,808,058 | 2/1989 | Carney et al. | 414/343 |
| 4,902,955 | 2/1990 | Manis et al. | 320/2 |
| 4,967,895 | 11/1990 | Speas | 194/200 |
| 4,983,903 | 1/1991 | Bae et al. | 320/2 |
| 5,091,687 | 2/1992 | Meyer et al. | 320/2 |

Primary Examiner—Steven L. Stephan
Assistant Examiner—B. Davidson

[57] ABSTRACT

The energy replenishment system offers uninterrupted operation for electric vehicles by instantly removing batteries (3A, 3B) by lifting device (15) from their compartment (2) when discharged, transferring them into charging shelf (57) having similar compartments (2C), and by placing recharged batteries in the vehicle's compartments (2). Automatic connector devices (31-51) instantly operated by the lifting device (15) provides high contact pressure and low contact resistance for the heavy currents on the battery terminals.

6 Claims, 3 Drawing Sheets

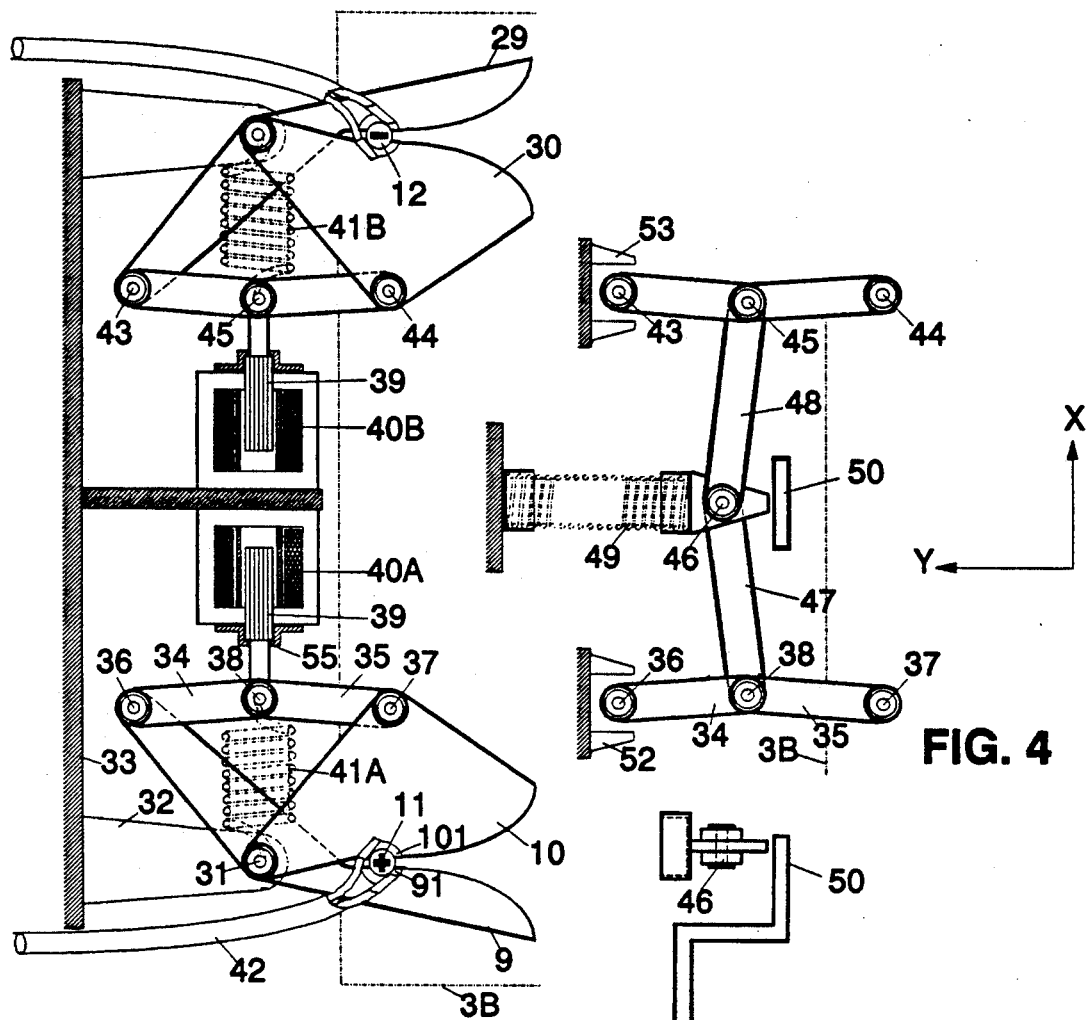

SYSTEM FOR REPLENISHMENT OF ENERGY STORED IN A BATTERY ON AN ELECTRIC VEHICLE

BACKGROUND

1. Field of Invention

This invention relates to energy replenishment systems for electric vehicles: specifically, to battery replacement and charging outside of the vehicles.

2. Description of Prior Art

Electric vehicles first appeared at the beginning of the twentieth century, but they could not compete with the emerging technology based on the use of the internal combustion engine. Their main disadvantage was the necessity to interrupt the service for recharging the batteries after a relatively short operation.

Energy is stored on electric vehicles in rechargeable batteries for their operation. The commercially available batteries have inadequate storage capacity for their weight. Therefore, the largest number of the prior art concerned with the reduction of the weight of the vehicles with the objective of increasing the range between two time-consuming recharging operations. This range still is not long enough to allow the use of an electric vehicle for longer trips. These vehicles are designed therefore for local traffic, until one of the promising new light-weight batteries will be commercially available for increasing the range.

All of the prior art considers batteries as fixed parts of the vehicle. The batteries are built in the vehicles according to this view, and their removal is no simple operation. No efforts can be demonstrated for standardizing battery dimensions and voltages to make interchangeability possible. No effort is detectable to provide batteries, compartments, and connectors designed for instant removability for outside recharging, and the installment of recharged batteries for providing unlimited operation. No battery service stations are available for the service of exchanging discharged batteries with freshly charged ones.

OUTLINE OF THE INVENTION

The purpose of the invention is to provide a system for electric vehicles for replenishing the energy in the batteries without the frequent inoperative time intervals when the batteries are charged. The system offers unlimited continuous operation, equivalent to the service of the internal combustion engine equipped vehicles, but without the costly maintenance, air and noise pollution. Further advantage is the substantially increased efficiency of the electric traction system.

The proposed way for achieving this goal is using standard batteries in all vehicles and providing standard battery replacement service capable of instantly replacing discharged batteries with charged ones.

(ii) providing charging outlets at parking facilities where the charging cables of the vehicles can be plugged in while the vehicle is parked.

The most advantageous arrangement is to install at least two batteries in each vehicle, using them sequentially, one after the other. When the first one got discharged, it can be replaced if needed without interrupting the operation. Larger vehicles may use more than two batteries.

The instant replacement is accomplished by using a semi-automatic lifting device and powerful automatic gripping connectors. The lifting device can be set for handling one battery, or two batteries simultaneously.

The proposed system requires the use of interchangeable batteries. Therefore, the establishment of an adequate battery standard is preliminary condition for the application of the system. The features subject to standardization are: dimensions, voltage, peak current, internal impedance, minimum capacity/weight ratio, minimum life expectancy. As batteries with increased ratio will become available, the operating range will proportionally increase between battery exchanges or recharging. The vehicles can run longer between servicing.

It is advisable that in the process of establishing the battery standards, developments already in their advanced stages in laboratories should be taken into consideration.

Objects and Advantages

In view of the foregoing, several objects and advantages of the present invention are:

(a) to provide an economical and convenient way for the replenishment of electric energy in battery operated electric vehicles without significant interruption of the operation for battery charging;

(b) to provide an electric vehicle system capable of continuous operation and longer trips, equivalent to the conventional internal combustion engine driven vehicles;

(c) to provide a possibility for building electric vehicles with conventional weight and safety standards with all customary user comfort and performance, including acceleration;

(d) to provide an electric vehicle system that can offer uninterrupted service equivalent to the internal combustion engine driven vehicles, but with far superior efficiency in energy use, especially in stop-and-go city traffic where the kinetic energy content of the vehicles can be saved by regenerative braking for charging the batteries;

(e) to provide an electric vehicle system that operates with low-cost, virtually maintenance-free motors with superior reliability;

(f) to provide an electric vehicle system which—in case of general acceptance—is capable of eliminating air and noise pollution generated by the internal combustion engines.

Further objects and advantages will become apparent from a consideration of the ensuing description and drawings.

Drawing Figures

FIG. 3 shows a plan view of a twin connector system with electromagnetic operation;

FIG. 4 shows a partial plan view of the twin connector system with additional elements for mechanical operation by the lifting device;

FIG. 5 shows a partial side view of the mechanical operating elements.

Description of FIG. 1 to 6

The energy replenishment system based on battery exchange is illustrated in FIG. 1 to 6.

Figure 1:
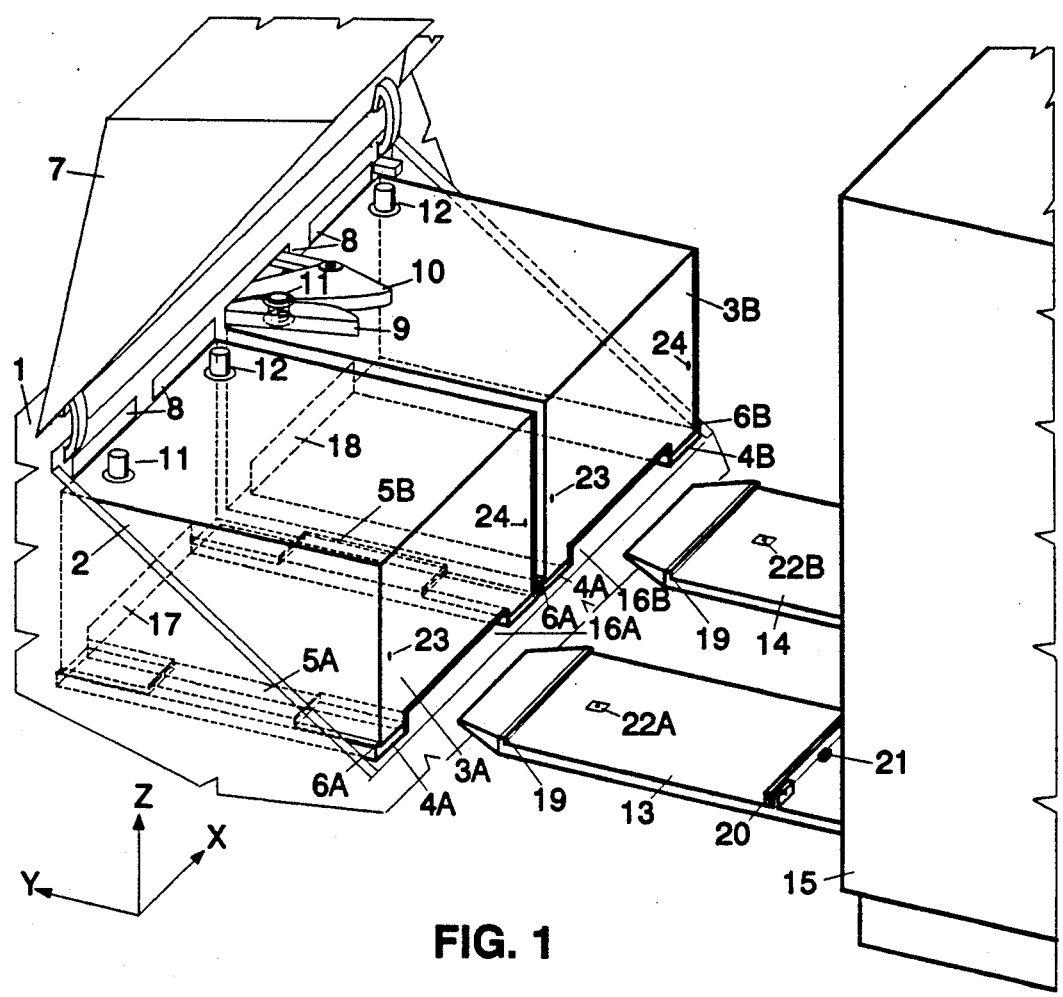
FIG. 1 is an isometric view of a vehicle's battery compartment and a lifting device.
Figure 2:
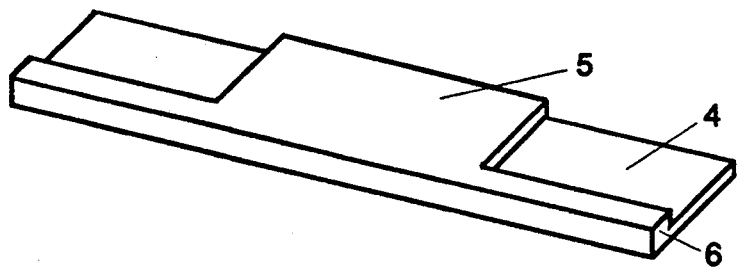
FIG. 2 is an enlarged view of a support member of FIG. 1.

FIG. 1 and 2 illustrate portion 1 of the body of an electric vehicle housing standard battery compartment 2. Two standard batteries 3A, 3B are accommodated in compartment 2. For each battery, two flat support members 4A, 4B are attached to the bottom surface of compartment 2 having a raised central portion 5, and edge portions 6. Support member 4 is shown more clearly in FIG. 2. In FIG. 1, support members supporting the left edge of the battery marked with 4A, 5A, and 6A; support members supporting the right side of the battery are placed in reversed position, and marked 4B, 5B, and 6B. The bottom surface of the battery is formed with four legs to match the surface configuration of support members 4A, 4B, with edges well rounded on both. The matching protrusions define the exact position of each battery 3A, 3b in compartment 2. Hood 7 is shown in open position over compartment 2; its inner surface is provided with a flexible frame having matching shape to fit the upper contours of each battery. Thus when lid 7 is closed, batteries 3A, 3B are firmly locked in their position in compartment 2. On the top of the battery casing, terminals 11, 12 are protruding from the surface. On the rear wall of compartment 2, four windows 8 are cut out to accommodate protruding gripper members 9, 10 (or 29, 30 for terminal 12) of an automatic connector (shown in detail in FIG. 3). Each of the terminals are gripped by a pair of gripper members 9, 10, or 29, 30. (In FIG. 1, to avoid the crowding of the drawing, only one pair of gripper members 9, 10 is shown.) On the right side of FIG. 1, two protruding lifting plates 13, 14 of special purpose fork-lift type lifting device 15 is shown facing openings 16A, 16B created by the protrusions of the bottom surface of batteries 3A, 3B, and support members 4A, 4B. On the bottom of the rear wall of compartment 2, windows 17, 18 are cut out for the accommodation of the tapered lead members of lifting plates 13, 14. Fixed step 19, and spring-loaded slightly moveable cross bar 20 are protruding on the top surface of plates 13, 14. Limit switch 21 is operated by cross bar 20 when it approaches its furthest position to the right. Limit switch 22A is operated when plate 13 moves upward and pressed against the bottom surface of battery 3A as it approaches its nested position between edges of bars 19 and 20. Limit switch 22B has identical role on plate 14. On the front wall of the battery casing, small mirrors 23, 24 are embedded into the surface parallel to the surface.

In FIG. 3, 4, and 5 the details of an automatic battery connector is illustrated. As shown already in FIG. 1, a pair of gripper members 9, 10 are protruding through window 8 to exert firm pressure on positive terminal 11 of battery 3B. Negative terminal 12 is gripped by members 29, 30 in a configuration with mirror symmetry. Since the symmetry is perfect, it is sufficient to describe the lower half in details. Members 9, 10 are capable of rotating around pin 31 supported by extension 32 of body 33. On the far side of members 9, 10, two struts 34, 35 are connected to them through pins 36 and 37. The other end of the two struts are connected through pin 38 to plunger 39 of electromagnet 40A. Spring 41A pulls pins 31, 38 closes until the firming up of the grip on terminal 11 stops the movement of members 9, 10, or when no battery is present, the plunger reaches its limiter 55.

To allow some self-alignment for members 9, 10 in the case of misalignment between the cylindrical contacting surfaces 91, 101 and terminal 11, pin 31 should have some freedom to move in a slot in "Y" direction. Members 9, 10 are made out of insulating material (preferably glass-fiber based), with half-cylinder-shaped contact pieces 91, 101 attached to them. Cable 42 is to connect the positive terminal 11 through contacts 91, 101 to the motor control system. Similar cable is used on negative terminal 12; if the battery system negative directly connected to the body, members 29, 30 can be made out of metal, and the cable serves only for securing a low resistance bypass parallel to the uncertain connection through the pins. Pins 43, 44, 45 and spring 41B have the same role respectively as pins 36, 37, 38 and spring 41A with the lower gripper members 9, 10 serving terminal 11.

FIG. 4 and 5 illustrate the additional parts needed for mechanically operating the connector pair shown in FIG. 3. Two struts 47, 48 are connected to movable pin 46. The other end of strut 47 is connected to pin 38, and strut 48 to pin 45. Between pin 46 and the body a compressed spring 49 is inserted while expansion springs 41A, 41B are eliminated. Lifting plate 14 of lifting device 15 operates the connector pair by pushing lever 50 against pin 46. A limiter 51 (attached to the body) serves to stop the movement of lever 50 when no terminal is in the gripper. Limiters 52, 53 maintain the position of connector members 9, 10, 29, 30 to accept the terminals when the battery is loaded in. The rest of the connector assembly (not shown in FIG. 4, 5) remains the same as in FIG. 3.

Figure 6:
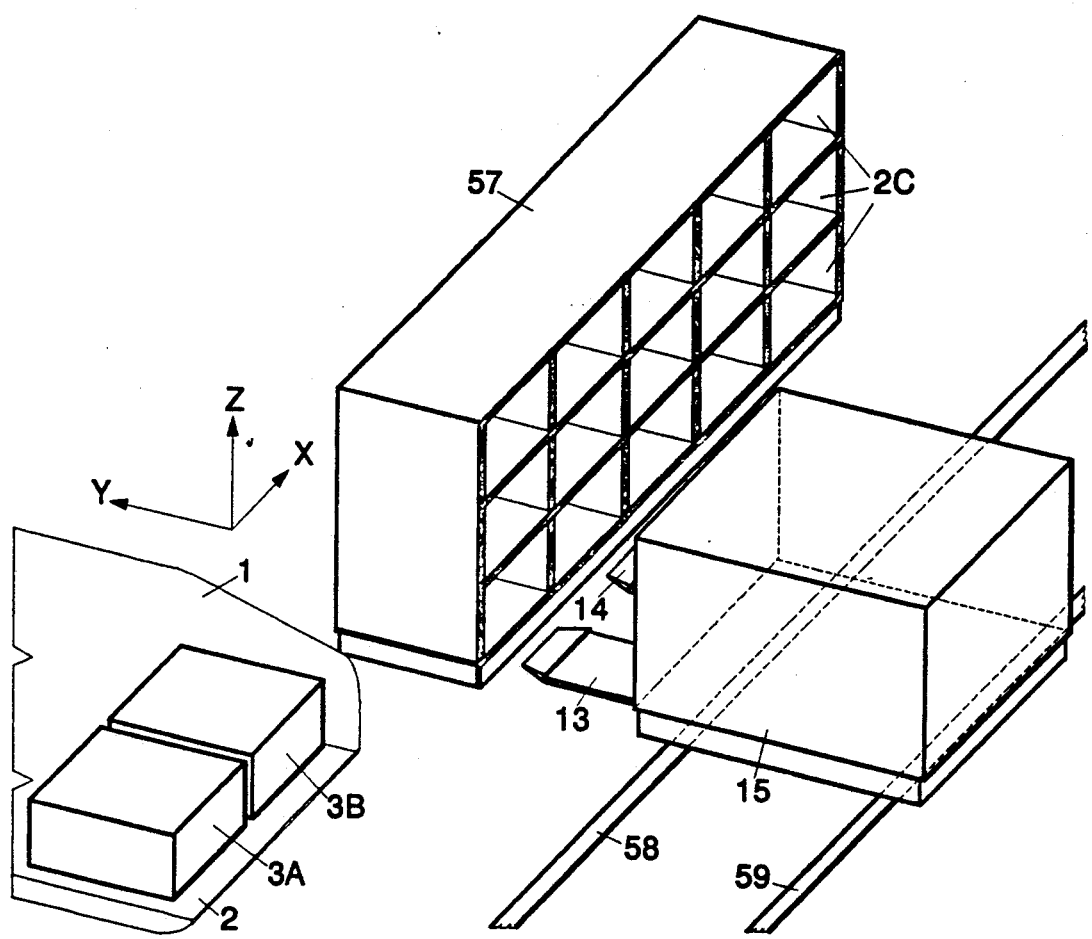
FIG. 6 shows an isometric view of a battery service station.

FIG. 6 illustrates a battery service station with charging compartments, lifting device, and a vehicle under service. Portion 1 of the body of a vehicle is shown with an open battery compartment 2 with a pair of batteries 3A, 3B lined up for battery exchange. Charging shelf system 57 is arranged with a number of battery compartments 2C. Each is identical in dimensions with the compartment described in connection with FIG. 1 to 5, and equipped with the same automatic connector pair. The charging operation is stationary, thus support members 4A, 4B, and hood 7 are not needed on the shelf. Lifting device 15, as described in connection with FIG. 1, is movably accommodated on rails 58, 59 for handling the battery exchange between the vehicle and any compartment on the shelf system.

The Operation in FIGS. 1 to 6

The vehicle in service lines up with its battery compartment 2 closely aligned with charging shelf system 57 (as shown in FIG. 6). The battery exchange system is designed for semi-automatic operation: a human operator initiates the operation, feeds in the command for single or double removal, or replacement, and moves lifting device 15 under manual control close to the position shown in FIG. 1. At this point lifting device 15 is close enough to engage the sensors for starting the automatic procedure.

In FIG. 1: Lifting device 15 is equipped with four light sources facing each mirror 23, 24 on the surface of batteries 3A, and 3B. Light sensors are placed around the light sources. In case of misalignment, the reflected light from mirrors 23, 24 hits a sensor farther away from the light source. This sensor initiate a movement of lifting device 15, which causes the reflected light to hit sensors closer and closer to the light source, until the closest alignment is established. When the guiding process completed, the last sensor starts the forward movement of lifting plates 13, 14 through opening 16A, 16B respectively. The tapered front ends of lifting plates 13, 14 penetrate windows 17, 18, and plate 14 executes the release operation of automatic connector members 9, 10 and 29, 30 mechanically through lever 50 (in FIG. 4, 5) and struts 47, 48 joined by pin 46. In the electromagnetic version, lever 50 operates a limit switch (not shown) energizing electromagnets 40A, 40B (in FIG. 3) which pull pins 38, 45 closer causing the release of the grip on terminals 11 and 12.

The arrangement of struts in knee-joint configuration (as shown in FIG. 3 and 4) has the advantage of variable ratio with substantial amplification of the force exerted by spring 41A, 41B or 49 when members 9, 10 approach closed position. As spring 41A pulls pin 38 closer to the line defined by pins 36, 37, the contact pressure on terminal 11 keeps growing with close to inverse proportion of the decreasing distance of pin 38 from the line. To avoid the appearance of forces damaging to the mechanism or the terminal, the decrease of the distance is restricted by limiter 51 in FIG. 5, and by shoulder 55 in FIG. 3.

In FIG. 4, 5: The double knee-joint arrangement increases the contact pressure substantially even when a single weaker spring 49 is used. When lifting plate 14 penetrates window 18 and moves pin 46 in "Y" direction via lever 50 compressing spring 49, both grippers 9, 10, and 29, 30 (in FIG. 3) open up and the instant removal of batteries 3A, 3B becomes possible.

In FIG. 1: When lifting plates 13, 14 moved through openings 16A, 16B, the movement will be stopped by limit switch 21, when bar 20 hits the bottom edge of battery 3A. At the same time lifting plates 13, 14 start moving upward to lift the batteries out of their locked position on support members 4A, 4B. When limit switches 22A, 22B engage the bottom surface of batteries 3A, 3B respectively, they stop the upward motion of their plate after a predetermined additional lift to cover protrusion 5A, 5B of support members 4A, 4B. After stopping, the plates pull out batteries 3A, 3B from compartment 2, and unload them into two empty compartments 2C of shelf 57 in FIG. 6. The next step is the removal of two charged batteries from shelf 57, and unload them into compartment 2. Since charging compartments 2C and vehicle compartments 2 have identical configuration, the loading and unloading of batteries into either one are essentially the same tasks, and after the initial approach of the vehicle, guided by the operator, the rest of the process can be performed automatically. After the connectors gripped the terminals in their charging compartments 2C, the automatic charging control starts the charging process; after it is completed, the charging stops automatically. At this time, an indicator light comes on at the compartment to assist the automatic system, or the operator to find charged batteries on the shelf ready to go.

Summary, Ramifications, and Scope

It can be seen from the above description that with available technology, an adequate electric vehicle system is now feasible. The proposed system has equivalent performance to the conventional system based on the internal combustion engine. No need exists for waiting until storage batteries with improved capacity/weight ratio will become available. A large number of vehicles spend enough time in parking facilities to keep their batteries charged all the time. Improvement of the batteries would not be noticed by this type of user.

Those vehicles used for long trips can be operated without restriction if their batteries can be instantly exchanged on the road, as proposed. Their users would enjoy a slight benefit from future battery improvements by being able to operate their vehicles with less frequent exchange stops.

Since keeping batteries charged is no problem in the proposed system, there is no reason to build undersized and underpowered vehicles with weak electric motors incapable of climbing hills, or accelerating in the customary manner.

The above described system can be assembled using commercially available parts, and special parts can be produced using available technology. Existing vehicles may also be converted to electric operation.

Solar panels can be installed on the structure of parking facilities. This combination provides clean energy for city traffic eliminating not only the pollution of the city air, but also the greenhouse gases produced by fossil fuel burning power plants contributing to the global warming.

The most substantial benefit will be achieved by the inherent advantages of operating electric motors on the road, instead of internal combustion engines.

The first benefit is the energy savings. Electric energy, which can be produced with the highest efficiency from large variety of different sources—that is, without too much energy loss—compares very favorably with internal combustion engines with their efficiency being around 17% on highway, decreasing to a level close to the half of that in stop-and-go city traffic. That means, that well over 80% of the energy is lost in the cooling system of the internal combustion engine and in the brakes. Using electric vehicles, additional significant energy savings can be realized especially in city traffic by the possibility of using the motor as generator for braking, and feeding the generated energy back to the batteries for storage.

The second, no less significant benefit is the total elimination of air pollution in the environment. Electric vehicles do not have exhaust or any other emissions. And there is no engine noise. Only a very low intensity noise is generated by the tires and the air flow.

The described mechanical arrangements and devices represent only a few examples. Many additional arrangements and designs are feasible with comparable results within the scope of the invention. Therefore, the above description should not be construed as limiting the scope of the invention but merely as providing illustrations of some of the presently preferred embodiments of the invention. Thus the scope of the invention should be determined by the appended claims and their legal equivalents, rather than by the examples given.

What is claimed is:

1. A system for replenishment of energy stored in a battery on electric vehicles comprising a vehicle having at least one battery compartment (2) at least one battery (3A, 3B) in each said battery compartment having two terminals (11, 12) protruding from a battery surface, a fork-lift type lifting means (15) having at least one lifting plate (13, 14) adapted to engage the battery surface, a charging shelf (57) having a plurality of compartments (2C) for receiving said battery for charging and storage, automatic connector means (9, 10, 29 to 53) in each battery compartment, each said connector means having two pairs of gripper members (9, 10 and 29, 30) for engaging said two terminals, each said pair of gripper means being capable of rotating around a pin (e.g., 31) supported by an extension (32) of a body of said battery compartment (2), two pins (36, 37 and 43, 44) connecting each pair of said gripper members to a first end of two first struts on a far side of said members, another end of each said two first struts are connected to each other by two connecting pins (38 and 45), each said connecting pin pulled by a first spring (41A and 41B) firming up a grip on said terminals by an arrangement of at least two of said first struts connected to each other by said connecting pins (38 and 45) in a first knee-joint configuration producing variable ratio with substantial amplification of a force exerted to said connecting pins (38 and 45) by said first spring (41A and 41B), said two first struts exerting said amplified force to said gripper members gripping said terminal with growing contact pressure while said first spring moves said connecting pins (38 and 45) of said two first struts closer to a first line defined by said two pins (36, 37 and 43, 44) connecting said gripper members (9, 10 and 29, 30) to said two first struts on the far side of said members causing a contact pressure on said terminals (11, 12) to grow close to inverse proportion to a distance between said connecting pins and said first line.

2. A system for replenishment of energy stored in a battery on electric vehicles as defined in claim 1, having an arrangement wherein the two first struts for each terminal connected to each other by said connecting pins (38, and 45) are arranged in said first knee-joint configuration producing variable ratio with substantial amplification of a force exerted by two second struts (47, 48), with first and second ends, said two second struts connected to each other at the first ends by a second pin (46), the second ends of said second struts (47, 48) connected to said two first pins (38, 45) and arranged in a second knee-joint configuration producing variable ratio with substantial amplification of a force exerted by a second spring (49) when said gripper members (9, 10 and 29, 30) approach a closed position, said second spring exerting force to said second pin (46) moving said second pin closer to a second line defined by said two connecting pins (38, 45) causing growing pressure on said two connecting pins (38, 45) increasing contact pressure on said terminals, growing close to inverse proportion to the product of two decreasing distances between said connecting pins and said first line, and said second pin and said second line.

3. A system for replenishment of energy stored in a battery on an electric vehicle as defined in claim 1, further including release means (50) for executing release operations initiated by forward movement of said lifting plates (13, 14) causing opening up of said gripper members and the release of a grip on said terminals whereby instant removal of said battery becomes possible.

4. A system for replenishment of energy stored in a battery on an electric vehicle as defined in claim 1, further including electromagnet means (40A, 40B) for releasing a grip on said terminal, energized by a switch operated by release means (50) and lifting plate (13, 14) for pulling at least one of the connecting pins (38, 45) of said two struts against a pull of at least one of said springs (41A, 41B).

5. A system for replenishment of energy stored in a battery on electric vehicles according to claim 1, wherein a plurality of battery service stations are provided having a charging shelf system (57) comprising a plurality of compartments (2C) including automatic connector means, battery charging means connected to said connector means, said lifting means (15) being movable along said shelf system (57) and along at least one of said vehicles (1) for handling battery exchange between said vehicle and any of said plurality of compartments of said shelf system, and having at least one lifting plate, reaching close alignment for penetration of said battery compartment (2) on support members (4A, 4B) from said battery compartment (2) and unloading it into any empty compartment (2C) of said shelf (57), then lifting out at least one charged battery from said shelf and unloading it into said battery compartment.

6. A system for replenishment of energy stored in a battery on an electric vehicle according to claim 1, further including guide means (23, 24) for automatic alignment of said lifting means (15) with said battery compartment, and control means in said lifting means for instant replacement of batteries.

* * * * *